United States Patent
Wei

(10) Patent No.: US 10,658,922 B2
(45) Date of Patent: May 19, 2020

(54) CONTROL CIRCUIT AND DISPLAY APPARATUS FOR REDUCED STANDBY POWER CONSUMPTION

(71) Applicants: K-Tronics (Suzhou) Technology Co., Ltd., Suzhou, Jiangsu (CN); BOE TECHNOLOGY GROUP CO., LTD., Beijing (CN)

(72) Inventor: Kaitao Wei, Beijing (CN)

(73) Assignees: K-TRONICS (SUZHOU) TECHNOLOGY CO., LTD., Suzhou, Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/329,527

(22) PCT Filed: Mar. 15, 2018

(86) PCT No.: PCT/CN2018/079127
§ 371 (c)(1),
(2) Date: Feb. 28, 2019

(87) PCT Pub. No.: WO2018/166497
PCT Pub. Date: Sep. 20, 2018

(65) Prior Publication Data
US 2019/0222114 A1 Jul. 18, 2019

(30) Foreign Application Priority Data

Mar. 17, 2017 (CN) .................... 2017 2 0262335 U

(51) Int. Cl.
*H02M 1/36* (2007.01)
*H02M 1/32* (2007.01)
(Continued)

(52) U.S. Cl.
CPC ............... *H02M 1/36* (2013.01); *H02J 9/005* (2013.01); *H02M 1/32* (2013.01); *H02M 7/06* (2013.01);
(Continued)

(58) Field of Classification Search
CPC ............ H02M 1/36; H02M 1/32; H02M 7/06; H02M 2001/0006; H02M 2001/0032; H02J 9/005
See application file for complete search history.

(56) References Cited

U.S. PATENT DOCUMENTS 3,499,115 A * 3/1970 Sontag .................. H04M 9/001
379/168
2003/0078685 A1* 4/2003 Shao ....................... G08C 19/28
700/75
(Continued)

FOREIGN PATENT DOCUMENTS

| CN | 2755883 Y | 2/2006 |
|---|---|---|
| CN | 1936741 A | 3/2007 |
| CN | 102183899 A | 9/2011 |
| CN | 206807282 U | 12/2017 |

OTHER PUBLICATIONS

International Search Report; Application No. PCT/CN2018/079127; dated Jun. 13, 2018; English Translation Attached.

*Primary Examiner* — Yusef A Ahmed
(74) *Attorney, Agent, or Firm* — Nath, Goldberg & Meyer; Joshua B. Goldberg

(57) ABSTRACT

The present disclosure provides a control circuit, including a power input terminal, an energy storage part, a switch part, and a trigger part, an input terminal of the energy storage part is coupled to the power input terminal, the energy storage part is configured to supply power to the control circuit after storing electric energy, an input terminal of the switch part is coupled to the power input terminal, an output terminal of the switch part is coupled to the power compo-
(Continued)

nent, a control terminal of the switch part is coupled to an output terminal of the trigger part, and the switch part is configured to control the input terminal of the switch part to be coupled to the output terminal of the switch part based on the trigger signal from the trigger part received by the control terminal of the switch part.

17 Claims, 5 Drawing Sheets

(51) Int. Cl.
    *H02M 7/06*     (2006.01)
    *H02J 9/00*     (2006.01)
    *H02M 1/00*     (2006.01)

(52) U.S. Cl.
    CPC ............... *H02M 2001/0006* (2013.01); *H02M 2001/0032* (2013.01); *Y02B 70/16* (2013.01)

(56) References Cited

U.S. PATENT DOCUMENTS

| | | | |
|---|---|---|---|
| 2010/0127569 A1* | 5/2010 | Dai | H02J 9/061 307/64 |
| 2012/0200230 A1* | 8/2012 | Esaki | H05B 33/0851 315/200 R |
| 2012/0217879 A1* | 8/2012 | Liu | H05B 33/0827 315/152 |
| 2012/0249150 A1* | 10/2012 | Anissimov | H05B 37/0263 324/415 |
| 2015/0042179 A1* | 2/2015 | Lin | G08C 17/00 307/140 |
| 2017/0005499 A1* | 1/2017 | Zhang | H02J 7/0083 |
| 2017/0201712 A1* | 7/2017 | Zhang | H02J 9/005 |
| 2017/0310923 A1* | 10/2017 | Yang | H05B 33/0815 |
| 2019/0158776 A1* | 5/2019 | Chen | G05B 13/021 |
| 2019/0222114 A1 | 7/2019 | Wei | |

* cited by examiner

CONTROL CIRCUIT AND DISPLAY APPARATUS FOR REDUCED STANDBY POWER CONSUMPTION

CROSS-REFERENCE TO RELATED APPLICATIONS

This is a National Phase Application filed under 35 U.S.C. 371 as a national stage of PCT/CN2018/079127, filed Mar. 15, 2018, and claims the priority of Chinese Patent Application No. CN201720262335.X, filed on Mar. 17, 2017, the contents of each of which are incorporated herein in their entirety by reference.

TECHNICAL FIELD

The present disclosure relates to the field of display apparatus technology, and in particular, relates to a control circuit and an apparatus including the control circuit.

BACKGROUND

At present, general display apparatuses have been widely applied to families and public places, while bringing about great convenience, consuming a huge amount of electric energy, and in particular, electric energy consumption of a display apparatus in a standby state is a waste of energy source.

SUMMARY

The objective of the present disclosure is to provide a control circuit, and a display apparatus including the control circuit.

As a first aspect of the present disclosure, there is provided a control circuit, including a power input terminal, an energy storage part, a switch part, a trigger part, and an output terminal. An input terminal of the energy storage part is coupled to the power input terminal, the energy storage part is configured to supply power to the control circuit after storing electric energy, an input terminal of the switch part is coupled to the power input terminal, an output terminal of the switch part is coupled to the output terminal of the control circuit, a control terminal of the switch part is coupled to an output terminal of the trigger part, the trigger part is configured to receive a trigger signal and send the received trigger signal to the switch part, and the switch part is configured to control the input terminal of the switch part to be coupled to the output terminal of the switch part based on the trigger signal received by the control terminal of the switch part from the trigger part.

In an embodiment, the trigger part includes a signal reception component and a control component, when the control component is powered on and in an operation state, the signal reception component delivers the received trigger signal to the control component through an output terminal of the signal reception component, the control component is able to, after receiving the trigger signal from the signal reception component, decode the received trigger signal, and when the decoded signal is a turn-off signal, the decoded signal is delivered to the output terminal of the trigger part, such that the control terminal of the switch part controls, after receiving the turn-off signal, the input terminal of the switch part to be disconnected from the output terminal of the switch part, and the energy storage part is charged to store electric energy by coupling the input terminal of the energy storage part to the power input terminal; when the control component is powered off, the signal reception component is able to deliver the received trigger signal directly to the output terminal of the trigger part through the output terminal of the signal reception component, and the control terminal of the switch part controls, after receiving the trigger signal, the input terminal of the switch part to be coupled to the output terminal of the switch part.

In an embodiment, the signal reception component includes: an energy storage subcomponent and a reception subcomponent, an output terminal of the energy storage subcomponent is coupled to a power terminal of the reception subcomponent, an input terminal of the energy storage subcomponent is coupled to an output terminal of the energy storage part, a ground terminal of the reception subcomponent is coupled to a first ground terminal, and an output terminal of the reception subcomponent is coupled to the output terminal of the signal reception component. The energy storage subcomponent is charged to store electric energy and supply power for operation of the reception subcomponent, and the reception subcomponent is able to receive the trigger signal, and send the received trigger signal to the control component or the switch part.

In an embodiment, the energy storage subcomponent includes a fifth capacitor and a fifth diode, a positive pole of the fifth capacitor is coupled to a cathode of the fifth diode, a negative pole of the fifth capacitor is coupled to an anode of the fifth diode, the negative pole of the fifth capacitor and the anode of the fifth diode are coupled to the first ground terminal, and both the positive pole of the fifth capacitor and the cathode of the fifth diode are the input terminal and the output terminal of the energy storage subcomponent.

In an embodiment, the fifth capacitor includes an electrolytic capacitor, and the fifth diode includes a Zener diode.

In an embodiment, the reception subcomponent includes an infrared receiver.

In an embodiment, the trigger signal includes an infrared signal.

In an embodiment, the control component includes an amplification subcomponent, a first photocoupler, a second photocoupler, and a control subcomponent, an input terminal of the amplification subcomponent is coupled to an input terminal of the control component, an output terminal of the amplification subcomponent is coupled to an input terminal of the first photocoupler, a first output terminal of the first photocoupler is coupled to an input terminal of the control subcomponent, a second output terminal of the first photocoupler is coupled to a second ground terminal, a power terminal of the first photocoupler is coupled to the output terminal of the energy storage part, a control terminal of the control subcomponent is coupled to an input terminal of the second photocoupler, a first output terminal of the second photocoupler is coupled to the output terminal of the energy storage part, and a second output terminal of the second photocoupler is coupled to an output terminal of the control component. The amplification subcomponent is configured to amplify the trigger signal received from the signal reception component, the first photocoupler is configured to transmit the amplified trigger signal from the amplification subcomponent to the control subcomponent, the control subcomponent is configured to process the received amplified trigger signal, and the second photocoupler is configured to, when the processed trigger signal is the turn-off signal, transmit the turn-off signal from the control subcomponent to the output terminal of the control component.

In an embodiment, the amplification subcomponent includes a fourth triode, a control terminal of the fourth triode is coupled to the input terminal of the control component, a first terminal of the fourth triode is coupled to the input terminal of the first photocoupler, and a second terminal of the fourth triode is coupled to the first ground terminal.

In an embodiment, the control terminal of the fourth triode is a base of the fourth triode, the first terminal of the fourth triode is a collector of the fourth triode, and the second terminal of the fourth triode is an emitter of the fourth triode.

In an embodiment, the control subcomponent includes a control chip and a fifth triode, an input terminal of the control chip is coupled to the input terminal of the control subcomponent, a control terminal of the control chip is coupled to the control terminal of the fifth triode, a first terminal of the fifth triode is coupled to the control terminal of the control subcomponent, a first terminal of the fifth triode is coupled to the input terminal of the second photocoupler, and a second terminal of the fifth triode is coupled to the second ground terminal.

In an embodiment, the control terminal of the fifth triode is a base of the fifth triode, the first terminal of the fifth triode is a collector of the fifth triode, and the second terminal of the fifth triode is an emitter of the fifth triode.

In an embodiment, the trigger part further includes a signal amplification component, an input terminal of the signal amplification component is coupled to the output terminal of the signal reception component and an output terminal of the control component, respectively, an output terminal of the signal amplification component is coupled to the output terminal of the trigger part, and the signal amplification component is configured to amplify the trigger signal input from the signal reception component or the control component.

In an embodiment, the signal amplification component includes a first signal amplification subcomponent, a second signal amplification subcomponent, and a third signal amplification subcomponent, an input terminal of the first signal amplification subcomponent is coupled to the input terminal of the signal amplification component, an output terminal of the first signal amplification subcomponent is coupled to an input terminal of the second signal amplification subcomponent, an output terminal of the second signal amplification subcomponent is coupled to an input terminal of the third signal amplification subcomponent, and an output terminal of the third signal amplification subcomponent is coupled to the output terminal of the signal amplification component. The first signal amplification subcomponent is configured to amplify the trigger signal input from the input terminal of the signal amplification component and transmit the signal amplified by the first signal amplification subcomponent to the second signal amplification subcomponent, the second signal amplification subcomponent is configured to amplify the signal received by the second signal amplification subcomponent and transmit the signal amplified by the second signal amplification subcomponent to the third signal amplification subcomponent, and the third signal amplification subcomponent is configured to amplify the signal received by the third signal amplification subcomponent and transmit the signal amplified by the third signal amplification subcomponent to the output terminal of the signal amplification component.

In an embodiment, the first signal amplification subcomponent includes a first triode, a control terminal of the first triode is coupled to the input terminal of the first signal amplification subcomponent, and a first terminal of the first triode is coupled to the input terminal of the second signal amplification subcomponent and an output terminal of the energy storage part, the second signal amplification subcomponent includes a second triode, a control terminal of the second triode is coupled to the input terminal of the second signal amplification subcomponent, a first terminal of the second triode is coupled to the output terminal of the energy storage part, and a second terminal of the second triode is coupled to a second terminal of the first triode, the third signal amplification subcomponent includes a third triode, a third capacitor and a sixth diode, a control terminal of the third triode is coupled to the second terminal of the first triode and the second terminal of the second triode, a first terminal of the third triode is coupled to the output terminal of the signal amplification component, the first terminal of the third triode is further coupled to an anode of the sixth diode, a cathode of the sixth diode is coupled to the output terminal of the energy storage part, a second terminal of the third triode is coupled to the first ground terminal, one terminal of the third capacitor is coupled to the second terminal of the first triode and the second terminal of the second triode, and the other terminal of the third capacitor is coupled to the first ground terminal.

In an embodiment, the switch part includes a relay, and a control terminal of the relay includes a first control terminal and a second control terminal, the first control terminal of the relay is coupled to an output terminal of the energy storage part, and the second control terminal of the relay is coupled to the output terminal of the signal amplification component.

In an embodiment, the control circuit further includes a rectification part, an input terminal of the rectification part is coupled to the power input terminal, an output terminal of the rectification part is coupled to the input terminal of the energy storage part, and the rectification part is able to convert AC power input from the power input terminal into DC power.

In an embodiment, the input terminal of the rectification part includes a first AC input terminal and a second AC input terminal, and the first AC input terminal is coupled to the input terminal of the switch part. The rectification part includes a first capacitor, a second capacitor, a first diode, a second diode, a third diode and a fourth diode. One terminal of the first capacitor is coupled to the first AC input terminal of the rectification part, the other terminal of the first capacitor is coupled to a cathode of the first diode, one terminal of the second capacitor is coupled to the cathode of the first diode, the other terminal of the second capacitor is coupled to the output terminal of the switch part, an anode of the first diode is coupled to the first ground terminal, an anode of the second diode is coupled to the cathode of the first diode, a cathode of the second diode is further coupled to the output terminal of the rectification part, an anode of the third diode is coupled to the first ground terminal, a cathode of the third diode is coupled to the second AC input terminal of the rectification part, an anode of the fourth diode is coupled to the cathode of the third diode, and a cathode of the fourth diode is coupled to the output terminal of the rectification part.

In an embodiment, the energy storage part includes a fourth capacitor and a tenth resistor, one terminal of the tenth resistor is coupled to the input terminal of the energy storage part, the other terminal of the tenth resistor is coupled to a positive pole of the fourth capacitor, a negative pole of the fourth capacitor is coupled to a first ground terminal, and the positive pole of the fourth capacitor is an output terminal of the energy storage part.

As another aspect of the present disclosure, there is provided a display apparatus, including a remote control, a processor, a peripheral circuit coupled to the processor and a switch power control device. The switch power control device includes a power component and a power hard switch, and the switch power control device further includes the above-described control circuit according the present disclosure, the power hard switch is coupled to an AC power supply, the power input terminal of the control circuit is coupled to the power hard switch, the output terminal of the control circuit is coupled to an input terminal of the power component. The control circuit controls the input terminal of the power component to be coupled to the AC power supply based on whether the input terminal of the switch part is coupled to the output terminal of the switch part or not. An output terminal of the switch power control device is coupled to a power input terminal of the processor and is configured to supply power for operation of the processor, and the remote control is in communication with the switch power control device and is configured to emit a trigger signal to the switch power control device.

BRIEF DESCRIPTION OF THE DRAWINGS

The accompanying drawings, which constitute a part of the specification, are provided for further understanding of the present disclosure, and for explaining the present disclosure along with the following specific implementations, but not intended to limit the present disclosure, in which.

DETAILED DESCRIPTION

Specific implementations of the present disclosure will be described in detail below in conjunction with the accompanying drawings. It should be understood that the specific implementations described herein are solely for the purpose of explaining and interpreting the present disclosure rather than limiting the present disclosure.

Figure 1:
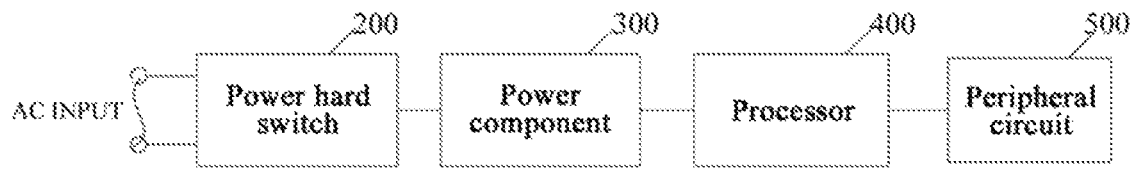
FIG. 1 is a block diagram of a circuit structure of a display apparatus in the prior art.

A display apparatus in prior art is shown in FIG. 1. The display apparatus mainly includes a power hard switch 200 configured to receive a AC power from a AC power supply, a power component 300, a processor 400, and a peripheral circuit 500. A principle of a standby state of the display apparatus is as follows: when the display apparatus is switched to the standby state by remote control, though only a circuit for receiving a remote signal and the processor 400 are in operation states and other circuits are power off, the power component 300 is also in an operation state for providing power thereto. Thus, there is still large power consumption.

Therefore, the question of how to reduce the standby power consumption of a display apparatus of the prior art has become an urgent technical problem to be resolved.

Figure 2:
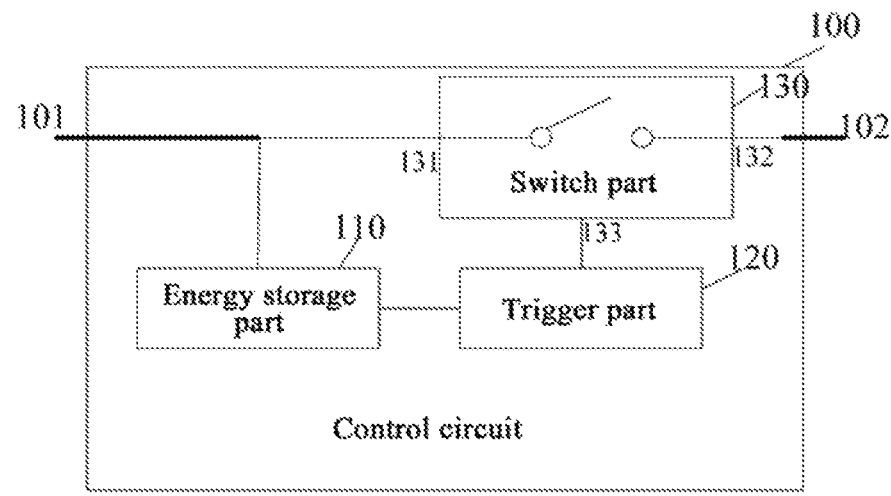
FIG. 2 is a block diagram of a first structure of a control circuit according to the present disclosure.

As a first aspect of the present disclosure, a control circuit 100 is provided. As shown in FIG. 2, the control circuit 100 includes a power input terminal 101, an energy storage part 110, a switch part 130, a trigger part 120, and an output terminal 102 of the control circuit. An input terminal of the energy storage part 110 is coupled to the power input terminal 101, and the energy storage part 110 is configured to supply power to the control circuit 100 after storing electric energy. An input terminal 131 of the switch part is coupled to the power input terminal 101, an output terminal 132 of the switch part is coupled to the output terminal 102 of the control circuit, a control terminal 133 of the switch part is coupled to an output terminal of the trigger part 120, and the switch part 130 is configured to change connection status between the input terminal 131 of the switch part and the output terminal 132 of the switch part when the control terminal 133 of the switch part receives a trigger signal from the trigger part 120.

When the control circuit according to the present disclosure is applied to a switch power control device of the display apparatus, it may be arranged between the power hard switch and the power component. The control circuit, upon receiving the trigger signal, is able to realize control of on-off between the AC power supply and the power component by altering connection status of the switch part. When the received trigger signal causes the switch part of the control circuit to turn off, the AC power supply and the power component can be disconnected. The control circuit of such a structure enables the display apparatus to have only a small operation current in the standby state, thereby reducing standby power consumption of the display apparatus.

Specifically, the trigger part 120 is configured to receive the trigger signal, and after receiving the trigger signal, the trigger part 120 sends the trigger signal to the switch part 130. When the switch part 130 is at On state, after receiving the trigger signal, the switch part 130 may be changed from On state to Off state; on the contrary, when the switch part 130 is at Off state, after receiving the trigger signal, the switch part 130 may be changed from Off state to On state. Since the input terminal 131 of the switch part is coupled to the power input terminal 101 of the control circuit, and the output terminal 132 of the switch part is coupled to the output terminal 102 of the control circuit, when the switch part 130 is switched from On state to Off state after receiving the trigger signal, the power input terminal 101 of the control circuit and the output terminal 102 of the control circuit also change from On state to Off state accordingly; on the contrary, when the switch part 130 is switched from Off state to On state after receiving the trigger signal, the connection state between the power input terminal 101 of the control circuit and the output terminal 102 of the control circuit also change from Off state to On state accordingly.

It can be understood that the energy storage part 110, coupled to the power input terminal 101, is capable of electric charging and energy storing by current input from the power input terminal 101, and the stored energy may be used for operation of the control circuit 100.

When the control circuit 100 having the above-described structure is applied to the switch power control device, it may be provided between the power hard switch and the power component. When the control circuit 100 is turned off, the power component and the AC power supply can be disconnected, so that there is only a very small current flowing in the control circuit 100 for charging a capacitor. At this time, the power component is in a non-operation state, thus standby power consumption of the display apparatus can be well decreased.

Figure 3:
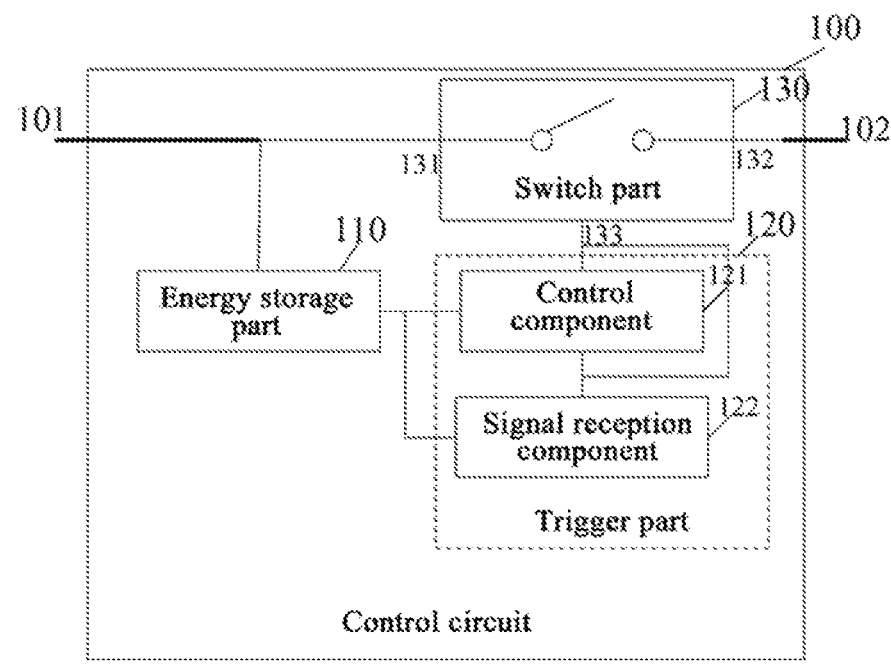
FIG. 3 is a block diagram of a second structure of a control circuit according to the present disclosure.

A specific implementation of the trigger part 120 is as shown in FIG. 3. The trigger part 120 may include a signal reception component 122 and a control component 121. When the control component 121 is powered on and in an operation state, the signal reception component 122 delivers the received trigger signal to the control component 121 through an output terminal of the signal reception component 122. The control component 121 can, after receiving the signal sent from the signal reception component 122, decode the received signal. When the decoded signal is a turn-off signal, the decoded signal is delivered to the output terminal of the trigger part 120 such that after the control terminal 133 of the switch part receiving the turn-off signal, the input terminal 131 of the switch part and the output terminal 132 of the switch part are controlled to be disconnected from each other. The input terminal of the energy storage part 110 performs energy storing and charging by coupling to the power input terminal 101.

When the control component 121 is powered off and in a non-operation state, the signal reception component 122 can deliver the received trigger signal directly to the output terminal of the trigger part 120 through the output terminal of the signal reception component 122. After the control terminal of the switch part 130 controls receiving the trigger signal, the input terminal 131 of the switch part and the output terminal 132 of the switch part are controlled to be connected.

Specifically, the control circuit 100 controls on-off of the switch part 130 by receiving a trigger signal through the trigger part 120. The trigger part 120 may include, specifically, the control component 121 and the signal reception component 122. The control circuit 100 receives the trigger signal through the signal reception component 122, and processes the trigger signal according to whether the control component 121 is powered on and in an operation state, thereby realizing control on-off of the switch part 130.

As a specific implementation of the signal reception component 122, the signal reception component 122 may include an energy storage subcomponent and a reception subcomponent. An output terminal of the energy storage subcomponent is coupled to a power terminal of the reception subcomponent, an input terminal of the energy storage subcomponent is coupled to an output terminal of the energy storage part, a ground terminal of the reception subcomponent is coupled to a first ground terminal, and an output terminal of the reception subcomponent is coupled to the output terminal of the signal reception component 122.

Figure 6:
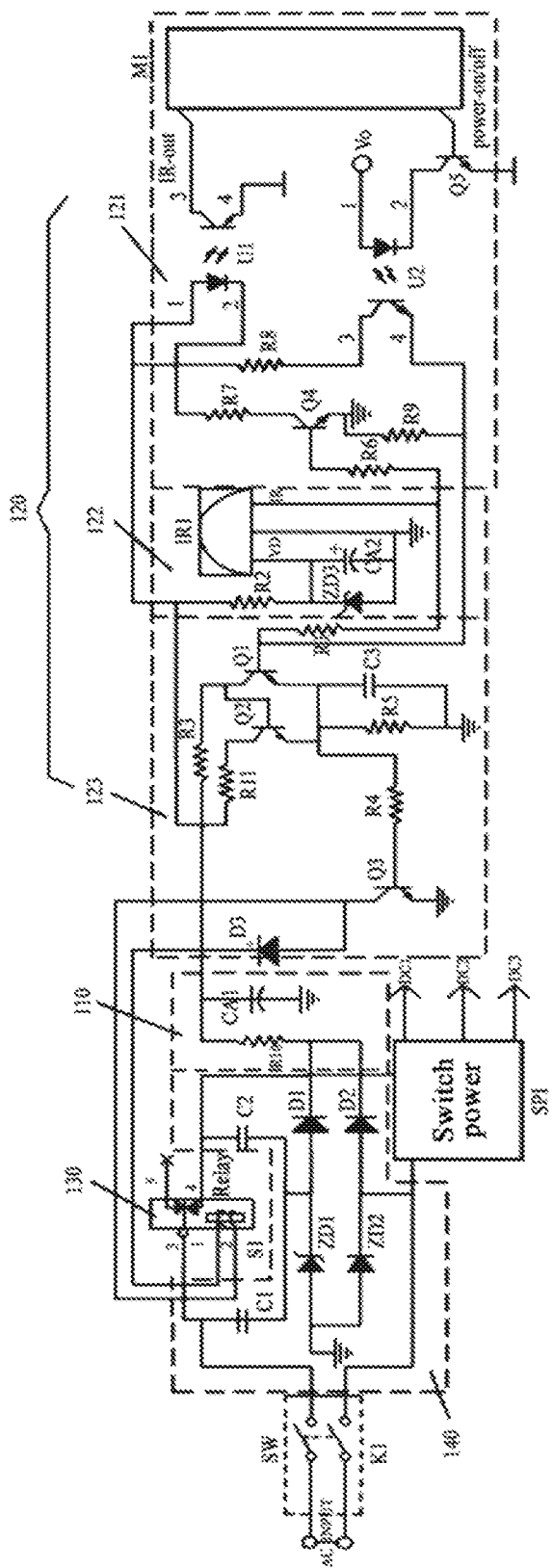
FIG. 6 is a diagram of a circuit structure of a control circuit according to the present disclosure.

Specifically, the energy storage subcomponent can perform charging and store energy by coupling to the energy storage part 110, and is coupled to the power terminal of the reception subcomponent, to supply power for operation of the reception subcomponent. As shown in FIG. 6, the reception subcomponent may be an infrared receiver IR1, the trigger signal may be an infrared signal. In a case where the energy storage subcomponent supplies operation power to the infrared receiver IR1 and the control component 121 is powered on, the infrared receiver IR1 sends the received infrared signal to the control component 121, and the control component 121 processes the infrared signal, i.e., sends the infrared signal to the switch part 130 when the infrared signal is a turn-off signal, to control the switch part 130 to be turned off.

As a specific implementation of the energy storage subcomponent, as shown in FIG. 6, the energy storage subcomponent may include a fifth capacitor CA2 and a fifth diode ZD3, a positive pole of the fifth capacitor CA2 is coupled to a cathode of the fifth diode ZD3, a negative pole of the fifth capacitor CA2 is coupled to an anode of the fifth diode ZD3 and they both are coupled to the first ground terminal, and both the positive pole of the fifth capacitor CA2 and the cathode of the fifth diode ZD3 are the input terminal and the output terminal of the energy storage subcomponent.

Specifically, as shown in FIG. 6, the fifth capacitor CA2, as a charge-discharge capacitor, may be an electrolytic capacitor. The fifth capacitor CA2 can perform charging by coupling to the energy storage part 110, and after the charging, the fifth capacitor CA2 supplies the operation power to the infrared receiver IR1 by discharging. In order that operation power of the infrared receiver IR1 is supplied stably, one fifth diode ZD3 may be coupled in parallel to the fifth capacitor CA2 for voltage stabilization. The fifth diode ZD3 may be a Zener diode.

A specific implementation of the control component 121 is as shown in FIG. 6. The control component 121 may include an amplification subcomponent, a first photocoupler U1, a second photocoupler U2, and a control subcomponent. An input terminal of the amplification subcomponent is coupled to an input terminal of the control component 121, an output terminal of the amplification subcomponent is coupled to an input terminal U1T2 of the first photocoupler U1, a first output terminal U1T3 of the first photocoupler U1 is coupled to an input terminal of the control subcomponent, a second output terminal U1T4 of the first photocoupler U1 is coupled to a second ground terminal, a power terminal U1T1 of the first photocoupler U1 is coupled to the output terminal of the energy storage part 110, a control terminal of the control subcomponent is coupled to an input terminal U2T2 of the second photocoupler U2, a first output terminal U2T3 of the second photocoupler U2 is coupled to the output terminal of the energy storage part 110, a second output terminal U2T4 of the second photocoupler U2 is coupled to the output terminal of the control component 121, and a power terminal U2T1 of the second photocoupler U2 is coupled to an output terminal of the power component.

Specifically, the control component 121 is configured to control the switch part 130 according to the trigger signal received by the signal reception component 122, and the control component 121 may specifically include the amplification subcomponent, the first photocoupler U1, the second photocoupler U2, and the control subcomponent. The amplification subcomponent amplifies the trigger signal received from the signal reception component 122, and in order to electrically isolate the control subcomponent and the amplification subcomponent, the amplified trigger signal is transmitted to the control subcomponent through the first photocoupler U1 which realizes the electrical isolation. The amplified trigger signal, after being processed by the control subcomponent, is transmitted to the output terminal of the control component 121 through the second photocoupler U2 which can also realizes the electrical isolation.

A specific implementation of the amplification subcomponent is as shown in FIG. 6. The amplification subcomponent may include a fourth triode Q4. A control terminal of the fourth triode Q4 is coupled to the input terminal of the control component 121, a first terminal of the fourth triode Q4 is coupled to the input terminal of the first photocoupler U1, a second terminal of the fourth triode Q4 is coupled to the first ground terminal. The control subcomponent may include a control chip M1 and a fifth triode Q5. An input terminal of the control chip M1 is coupled to the input terminal of the control subcomponent, a control terminal of the control chip M1 is coupled to the control terminal of the fifth triode Q5, a first terminal of the fifth triode Q5 is coupled to the control terminal of the control subcomponent and to the input terminal of the second photocoupler U2, and a second terminal of the fifth triode Q5 is coupled to the second ground terminal.

Specifically, the control terminal of the fourth triode Q4 is a base of the fourth triode Q4, the first terminal of the fourth triode Q4 is a collector of the fourth triode Q4, and the second terminal of the fourth triode Q4 is an emitter of the fourth triode Q4. The base of the fourth triode Q4 is coupled to the input terminal of the control component 121 through a resistor R6, the collector of the fourth triode Q4 is coupled to the input terminal of the first photocoupler U1 through a seventh resistor R7, and the emitter of the fourth triode Q4 is coupled to the first ground terminal and is coupled to the output terminal of the control component 121 through a ninth resistor R9. The first output terminal of the second photocoupler U2 is coupled to the output terminal of the energy storage part 110 through an eighth resistor R8. The control terminal of the fifth triode Q5 is a base of the fifth triode Q5, the first terminal of the fifth triode Q5 is a collector of the fifth triode Q5, and the second terminal of the fifth triode Q5 is an emitter of the fifth triode Q5. Thus, the collector of the fifth triode Q5 is coupled to the input terminal of the second photocoupler U2, and the emitter of the fifth triode Q5 is coupled to the second ground terminal.

It can be understood that, when the control component 121 is powered on and in an operation state, the trigger signal received by the signal reception component 122, after being processed by the control component 121, is sent to the switch part 130. Specifically, after receiving the trigger signal, the signal reception component 122 transmits it to the input terminal of the control component 121. As shown in FIG. 6, the input terminal of the control component 121 is coupled to the input terminal of the amplification subcomponent, the trigger signal input from the input terminal of the amplification subcomponent is transmitted to the fourth triode Q4 through the sixth resistor R6 to be amplified, and then is transmitted to the first photocoupler U1 through the seventh resistor R7. The amplified trigger signal is transmitted to the control chip M1 through the first photocoupler U1, and the control chip M1 processes, such as decodes, the amplified trigger signal. If the trigger signal is a turn-off signal, the trigger signal is transmitted to the second photocoupler U2 by the fifth triode Q5, and transmitted to the output terminal of the control component 121 through the second photocoupler U2.

Figure 4:
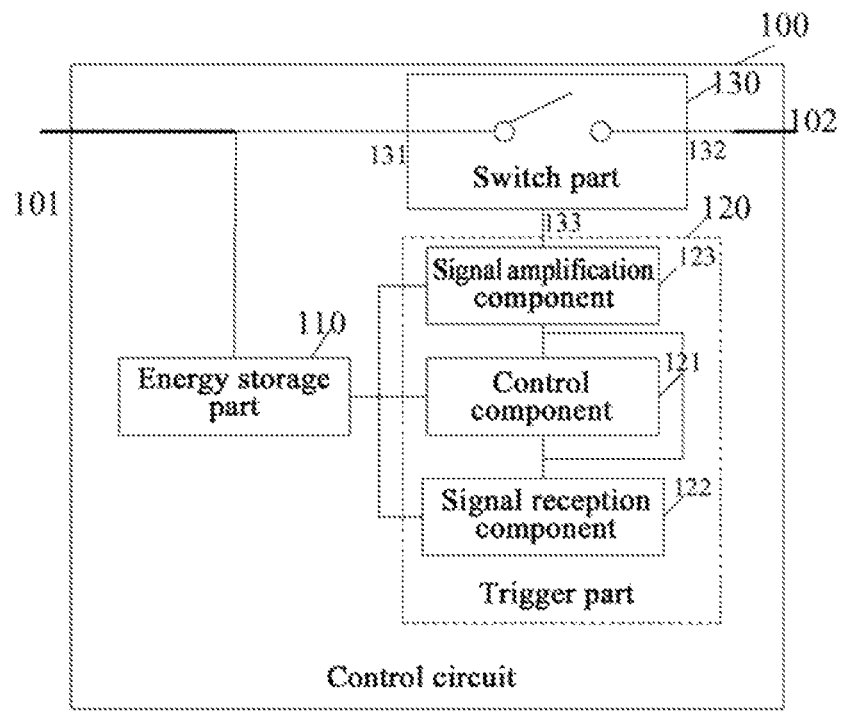
FIG. 4 is a block diagram of a third structure of a control circuit according to the present disclosure.

A specific implementation of the trigger part 120 is as shown in FIG. 4. In order to realize amplifying the trigger signal received by the trigger part 120, the trigger part 120 further includes a signal amplification component 123. An input terminal of the signal amplification component 123 is coupled to the output terminal of the signal reception component 122 and the output terminal of the control component 121, respectively, and an output terminal of the signal amplification component 123 is coupled to the output terminal of the trigger part 120.

As a specific implementation of the signal amplification component 123, the signal amplification component 123 may include multiple stages of signal amplification, and in particular, the signal amplification component 123 may include a first signal amplification subcomponent, a second signal amplification subcomponent, and a third signal amplification subcomponent. An input terminal of the first signal amplification subcomponent is coupled to the input terminal of the signal amplification component 123, an output terminal of the first signal amplification subcomponent is coupled to an input terminal of the second signal amplification subcomponent, an output terminal of the second signal amplification subcomponent is coupled to an input terminal of the third signal amplification subcomponent, and an output terminal of the third signal amplification subcomponent is coupled to the output terminal of the signal amplification component 123.

Further specifically, as shown in FIG. 6, the first signal amplification subcomponent may include a first triode Q1, a control terminal of the first triode Q1 is coupled to the input terminal of the first signal amplification subcomponent, and a first terminal of the first triode Q1 is coupled to the input terminal of the second signal amplification subcomponent and to the output terminal of the energy storage part 110. The second signal amplification subcomponent may include a second triode Q2, a control terminal of the second triode Q2 is coupled to the input terminal of the second signal amplification subcomponent, a first terminal of the second triode Q2 is coupled to the output terminal of the energy storage part 110, and a second terminal of the second triode Q2 is coupled to the second terminal of the first triode Q1. The third signal amplification subcomponent may include a third triode Q3, a third capacitor C3 and a sixth diode D3. A control terminal of the third triode Q3 is coupled to the second terminal of the first triode Q1 and the second terminal of the second triode Q2, a first terminal of the third triode Q3 is coupled to the output terminal of the signal amplification component 123, the first terminal of the third triode Q3 is also coupled to an anode of the sixth diode D3, a cathode of the sixth diode D3 is coupled to the output terminal of the energy storage part 110, a second terminal of the third triode Q3 is coupled to the first ground terminal. One terminal of the third capacitor C3 is coupled to the second terminal of the first triode Q1 and the second terminal of the second triode Q2, and the other terminal of the third capacitor C3 is coupled to the first ground terminal.

It could be understood that the trigger signal input from the input terminal of the signal amplification component 123 is first amplified by the first signal amplification subcomponent and transmitted to the second signal amplification subcomponent, after being amplified by the second signal amplification subcomponent, transmitted to the third signal amplification subcomponent, and finally transmitted from the output terminal of the third signal amplification subcomponent to the output terminal of the signal amplification component 123.

A specific implementation of the switch part 130 is as shown in FIG. 6. The switch part 130 may include a relay S1, and a control terminal of the relay S1 may include a first control terminal and a second control terminal. The first control terminal of the relay S1 is coupled to the output terminal of the energy storage part 110, and the second control terminal of the relay S1 is coupled to the output terminal of the signal amplification component 123.

Figure 5:
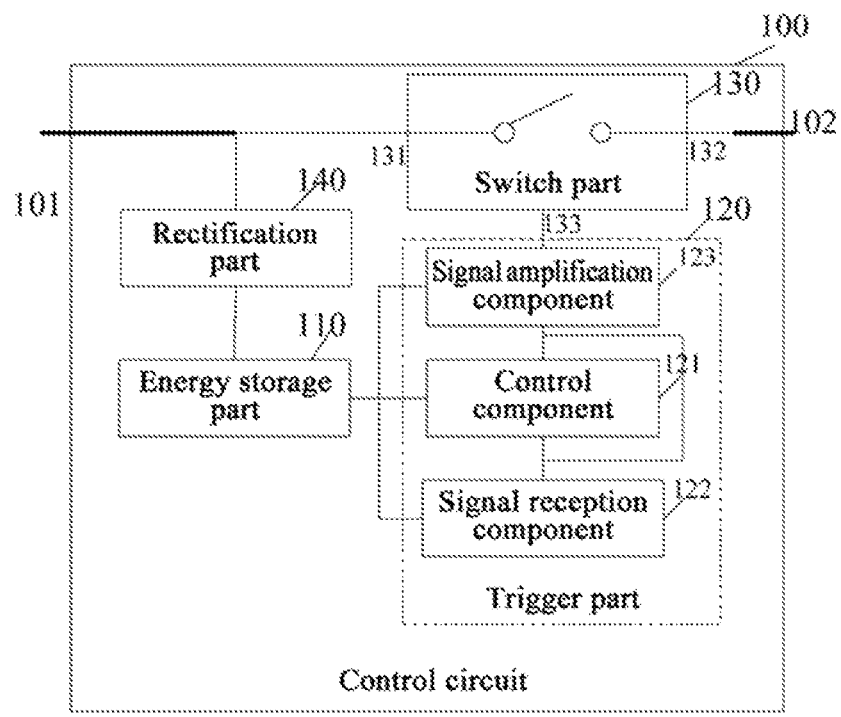
FIG. 5 is a block diagram of a fourth structure of a control circuit according to the present disclosure.

While AC power is input to the power input terminal 101 of the control circuit, and operation of the control circuit 100 requires DC power, as shown in FIG. 5, the control circuit 100 may further include a rectification part 140. An input terminal of the rectification part 140 is coupled to the power input terminal 101, an output terminal of the rectification part 140 is coupled to the input terminal of the energy storage part 110, and the rectification part 140 can convert AC power input from the power input terminal 101 to DC power.

A specific implementation of the rectification part 140 is as shown in FIG. 6. The input terminal of the rectification part 140 may include a first AC input terminal and a second AC input terminal, and the first AC input terminal is coupled to the input terminal of the switch part 130. The rectification part 140 may, specifically, include: a first capacitor C1, a second capacitor C2, a first diode ZD1, a second diode D1, a third diode ZD2 and a fourth diode D2. One terminal of the first capacitor C1 is coupled to the first AC input terminal of the rectification part, the other terminal of the first capacitor C1 is coupled to a cathode of the first diode ZD1, One terminal of the second capacitor C2 is coupled to the cathode of the first diode ZD1, the other terminal of the second capacitor C2 is coupled to the output terminal of the switch part 130, an anode of the first diode ZD1 is coupled to the first ground terminal, an anode of the second diode D1 is coupled to the cathode of the first diode ZD1, a cathode of the second diode D1 is coupled to the output terminal of the rectification part 140, an anode of the third diode ZD2 is coupled to the first ground terminal, a cathode of the third diode ZD2 is coupled to the second AC input terminal of the rectification part, an anode of the fourth diode D2 is coupled to the cathode of the third diode ZD2, and a cathode of the fourth diode D2 is coupled to the output terminal of the rectification part 140.

It is to be noted that, in order to stabilize voltage during rectification, the first diode ZD1 and the third diode ZD2 may preferably be Zener diodes.

A specific implementation of the energy storage part 110 is as shown in FIG. 6. The energy storage part 110 may include a fourth capacitor CA1 and a tenth resistor R10. One terminal of the tenth resistor R10 is coupled to the input terminal of e energy storage part 110, the other terminal of the tenth resistor R10 is coupled to a positive pole of the fourth capacitor CA1, a negative pole of the fourth capacitor CA1 is coupled to the first ground terminal, and the positive pole of the fourth capacitor CA1 is the output terminal of the energy storage part 110.

A working principle of the control circuit 100 will be described in detail below in conjunction with FIG. 6. As shown in FIG. 6, when a power hard switch K1 is turned on, AC electricity first enters the rectification part 140 and is coupled, through the first capacitor C1, to a rectification circuit consisting of rectifier diodes D1, ZD1, D2, and ZD2 to be rectified. A maximum output voltage after the rectification is a breakdown voltage of the Zener diodes ZD1, ZD2 and is greater than 10V in general. The rectified output voltage enters the energy storage part 110, and charges the fourth capacitor CA1 through the tenth resistor R10 until the fourth capacitor CA1 is fully charged and a voltage across the fourth capacitor CA1 reaches the rectified output voltage. In some embodiments, the fourth capacitor CA1 may be an electrolytic capacitor, which can both store energy and play a function of filtering. At this time, the fourth capacitor CA1 can be seen as an energy storage power source, the voltage of which can be supplied to the entire control circuit 100 for use. Meanwhile, the rectified output voltage also charges the fifth capacitor CA2 through the second resistor R2, until the fifth capacitor CA2 is fully charged and a voltage across the fifth capacitor CA2 reaches a breakdown voltage of the fifth diode ZD3. In some embodiments, the fifth capacitor CA2 may be an electrolytic capacitor which can both store energy and play a function of filtering. In some embodiments, the fifth diode ZD3 may be a Zener diode, and the voltage of the fifth capacitor CA2 is supplied to the reception subcomponent for use. The reception subcomponent specifically may be an infrared remote receive circuit, and the voltage of the fifth capacitor CA2 is 5V in general. The infrared remote receive circuit is capable of receiving an infrared signal sent by a remote control, for example, when a user needs to start up the display apparatus, the user may press any key on the remote control. Then the infrared remote receive circuit receives the infrared signal from the remote control due to the press, converts the infrared signal to a pulse electric signal and outputs it, and triggers the control circuit 100 to start operation.

This remote pulse signal may specifically be divided into two signals, one of them is sent, through the resistor R1, to the signal amplification component 123, that is, the base of the first triode Q1; and after being amplified in the first triode Q1, the second triode Q2 and the third triode Q3, the one of the two signals is outputted by the collector of the third triode Q3 to drive the relay S1 to be turned on, so as to supply the AC power to a power component SP1 and cause the display apparatus to normally operate. Pins 1 and 2 of the relay S1 (i.e., the first control terminal and the second control terminal) needs to be coupled in parallel to a reversed fly-wheel diode, that is, the sixth diode D3 in FIG. 6, thereby protecting the third triode Q3 from breakdown by a induced high voltage.

It should be noted that the capacity of the fourth capacitor CA1 is to be sufficiently large, so that the voltage across the fourth capacitor CA1 can be sustained during the operation of the control circuit 100, and the relay S1 can be kept turned on. At the same time, in order to guarantee that the third triode Q3 is stably saturated and turned on after the end of the trigger signal for starting up the display apparatus, it is required to add an integration capacitor, that is, the third capacitor C3 in FIG. 6, to the base of the third triode Q3. The third capacitor C3 can integrate the trigger signal for starting up the display apparatus, filter away AC component and reserve DC component of the trigger signal, and cause the third triode Q3 to be turned on continuously due to a large time constant of the circuit formed of the third capacitor C3 and the fifth resistor R5. Thus the relay S1 can be continuously turned on. When the AC power is supplied and the relay S1 is turned on, the second capacitor C2 is also turned on. The second capacitor C2, together with the first capacitor C1 coupled in parallel thereto, supplies power to the rectification circuit, and provides sufficient current to the control circuit 100, thereby ensuring that the relay S1 can operate for a long time.

Once the AC power is supplied and the relay S1 is turned on, the power component SP1 of the display apparatus can start operation. At this time, the control component 121 is fully powered on and starts operation. The control terminal POWER-ON/OFF of the control chip M1 of the control component 121 may output a high level (5V) control signal for turning on DC voltage outputs of the power component SP1 (that is, DC1, DC2, DC3 in FIG. 6). Meanwhile, this high level control signal is amplified through the second photocoupler U2, and delivered to the base of the first triode Q1, such that the amplification circuit formed of the first triode Q1, the second triode Q2 and the third triode Q3 can continue operation. Thus, this amplified high level control signal can keep the relay S1 turned on continuously. Thus, a self-lock status of the relay S1 is kept.

When the display apparatus is operating normally, if a user presses a functional key on a remote control, an infrared signal from the remote control is converted by the infrared remote receive circuit into a remote electric signal. The remote electric signal is delivered to the base of the fourth triode Q4 through the sixth resistor R6, amplified via the fourth triode Q4, outputted to the first photocoupler U1 through the seventh resistor R7 to be further amplified and isolated, and then outputted to the control chip M1 through the first output terminal of the first photocoupler U1. Then the remote electric signal is decoded by the control chip M1, and thus a functional operation corresponding to the remote electric signal is performed according to a result of the decoding. When the display apparatus is switched to be in a standby state by the remote control, the user sends a standby signal, that is, the above turn-off signal, to the control chip M1 through the remote control. The standby signal is first decoded by the control chip M1, and then a low level (0V) control signal is outputted from the control terminal POWER-ON/OFF of the control chip M1, so that the DC output voltages of the power component SP1 are turned off. After being amplified through the second photocoupler U2, this amplified low level control signal is still a low level signal, thereby causing the amplification circuits such as the first triode Q1, the second triode Q2 and the third triode Q3 to be turned off, and thus the relay S1 is also turned off and does not operate. As a result, the display apparatus returns to the standby state.

When the display apparatus is in the standby state, the first triode Q1, the second triode Q2, the third triode Q3 and the fourth triode Q4 do not operate, such that the entire control circuit 100 has a very small operation current, and the current for charging the fourth capacitor CA1 to maintain the voltage across the fourth capacitor CA1 is significantly small. In some embodiments, the operation current of the control circuit 100 is 10 mA and the operation voltage of the control circuit 100 is 15V. In this case, since the control circuit is applied to the display apparatus and the power component does not operate when the display apparatus is in the standby state, the standby power consumption of the display apparatus is 0.15 W. A display apparatus in the prior art which has the same configuration except for the control circuit in the present disclosure has a standby power consumption of 0.5 W. Thus, standby power consumption of the display apparatus is greatly reduced, and the control circuit 100 in the present disclosure brings no increase in cost. Thus, the control circuit in the present disclosure has the advantage of low cost and capability of reducing the standby power consumption.

Figure 7:
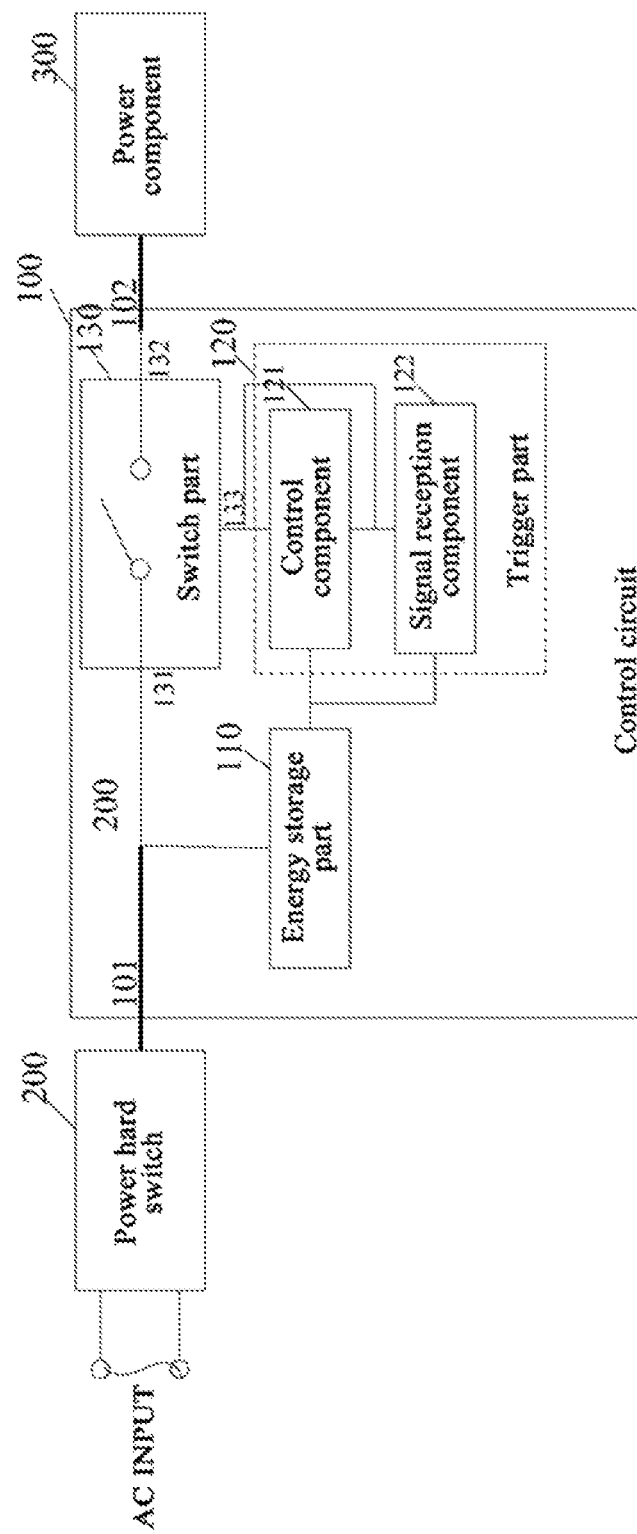
FIG. 7 is a block diagram of a structure of a switch power control device.
Figure 8:
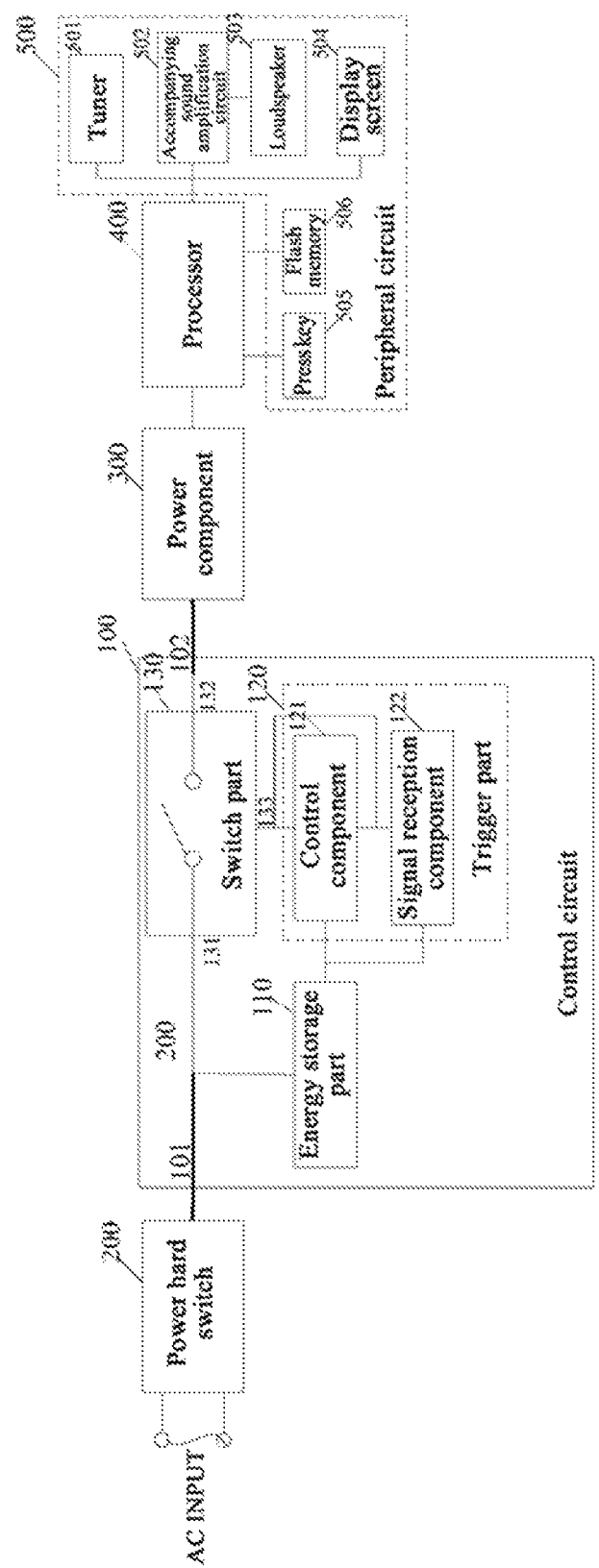
FIG. 8 is a block diagram of a structure of a display apparatus according to the present disclosure.

As a second aspect of the present disclosure, a display apparatus is provided. As shown in FIG. 8, the display apparatus includes a switch power control device, a processor 400, a peripheral circuit 500 which is coupled to the processor 400 and includes a tuner 501, an accompanying sound amplification circuit 502, a loudspeaker 503, a display screen 504, a press key 505, and a flash memory 506, and a remote control (not illustrated). As shown in FIG. 7, the switch power control device may include a power component 300 and a power hard switch 200, and the switch power control device may also include the control circuit 100 described in the foregoing. The power hard switch 200 is coupled to the AC power supply, the power input terminal 101 of the control circuit is coupled to the power hard switch 200, the output terminal 102 of the control circuit is coupled to the input terminal of the power component 300, and the control circuit 100 controls connection and disconnection between the input terminal of the power component 300 to be coupled to the AC power supply based on whether the input terminal 131 of the switch part is coupled to the output terminal 132 of the switch part. An output terminal of the switch power control device is coupled to a power input terminal of the processor 400 to supply power for operation of the processor 400.

The switch power control device provided by the present disclosure controls connection and disconnection between the power component and the AC power supply by using the control circuit described above. When the switch power control device is applied to the display apparatus, the switch power control device can reduce standby power consumption of the display apparatus.

The display apparatus provided by the present disclosure includes the switch power control device described above. Since the switch power control device causes the power component to be turned off and do not operate when the display apparatus is in the standby state, standby power consumption of the display apparatus can be decreased.

The display apparatus may be, for example, a television, a computer monitor or the like.

The remote control can be in communication with the switch power control device, and the remote control is configured to emit a trigger signal to the switch power control device.

It can be understood that, the above embodiments are only exemplary embodiments for the purpose of explaining the principle of the present disclosure, and the present disclosure is not limited thereto. For one of ordinary skill in the art, various improvements and modifications may be made without departing from the spirit and essence of the present disclosure. These improvements and modifications also fall within the protection scope of the present disclosure.

What is claimed is:

1. A control circuit, comprising a power input terminal, an energy storage part, a switch part, a trigger part, and an output terminal, wherein, an input terminal of the energy storage part is coupled to the power input terminal, the energy storage part is configured to supply power to the control circuit after storing electric energy, an input terminal of the switch part is coupled to the power input terminal, an output terminal of the switch part is coupled to the output terminal of the control circuit, a control terminal of the switch part is coupled to an output terminal of the trigger part, the trigger part is configured to receive a trigger signal and send the received trigger signal to the switch part, and the switch part is configured to control the input terminal of the switch part to be coupled to the output terminal of the switch part based on the trigger signal received by the control terminal of the switch part from the trigger part, wherein, the trigger part comprises a signal reception component and a control component, when the control component is powered on and in an operation state, the signal reception component delivers the received trigger signal to the control component through an output terminal of the signal reception component, the control component decodes, after receiving the trigger signal from the signal reception component, the received trigger signal, and when the decoded signal is a turn-off signal, the decoded signal is delivered to the output terminal of the trigger part, such that the control terminal of the switch part controls, after receiving the turn-off signal, the input terminal of the switch part to be disconnected from the output terminal of the switch part, and the energy storage part is charged to store electric energy by coupling the input terminal of the energy storage part to the power input terminal;

when the control component is powered off, the signal reception component delivers the received trigger signal directly to the output terminal of the trigger part through the output terminal of the signal reception component, and the control terminal of the switch part controls, after receiving the trigger signal, the input terminal of the switch part to be coupled to the output terminal of the switch part;

wherein, the signal reception component comprises an energy storage subcomponent and a reception subcomponent, an output terminal of the energy storage subcomponent is coupled to a power terminal of the reception subcomponent, an input terminal of the energy storage subcomponent is coupled to an output terminal of the energy storage part, a ground terminal of the reception subcomponent is coupled to a first ground terminal, and an output terminal of the reception subcomponent is coupled to the output terminal of the signal reception component, and the energy storage subcomponent is charged to store electric energy and supply power for operation of the reception subcomponent, and the reception subcomponent receives the trigger signal and sends the received trigger signal to the control component or the switch part, wherein, the energy storage subcomponent comprises a fifth capacitor and a fifth diode, a positive pole of the fifth capacitor is coupled to a cathode of the fifth diode, a negative pole of the fifth capacitor is coupled to an anode of the fifth diode, the negative pole of the fifth capacitor and the anode of the fifth diode are coupled to the first ground terminal, and both the positive pole of the fifth capacitor and the cathode of the fifth diode are the input terminal and the output terminal of the energy storage subcomponent.

2. The control circuit according to claim 1, wherein, the fifth capacitor comprises an electrolytic capacitor, and the fifth diode comprises a Zener diode.

3. The control circuit according to claim 1, wherein, the reception subcomponent comprises an infrared receiver.

4. The control circuit according to claim 3, wherein, the trigger signal comprises an infrared signal.

5. The control circuit according to claim 4, wherein, the control component comprises an amplification subcomponent, a first photocoupler, a second photocoupler, and a control subcomponent, an input terminal of the amplification subcomponent is coupled to an input terminal of the control component, an output terminal of the amplification subcomponent is coupled to an input terminal of the first photocoupler, a first output terminal of the first photocoupler is coupled to an input terminal of the control subcomponent, a second output terminal of the first photocoupler is coupled to a second ground terminal, a power terminal of the first photocoupler is coupled to the output terminal of the energy storage part, a control terminal of the control subcomponent is coupled to an input terminal of the second photocoupler, a first output terminal of the second photocoupler is coupled to the output terminal of the energy storage part, and a second output terminal of the second photocoupler is coupled to an output terminal of the control component, and the amplification subcomponent is configured to amplify the trigger signal received from the signal reception component, the first photocoupler is configured to transmit the amplified trigger signal from the amplification subcomponent to the control subcomponent, the control subcomponent is configured to process the received amplified trigger signal, and the second photocoupler is configured to, when the processed trigger signal is the turn-off signal, transmit the turn-off signal from the control subcomponent to the output terminal of the control component.

6. The control circuit according to claim 1, wherein, the trigger part further comprises a signal amplification component, an input terminal of the signal amplification component is coupled to the output terminal of the signal reception component and an output terminal of the control component, an output terminal of the signal amplification component is coupled to the output terminal of the trigger part, and the signal amplification component is configured to amplify the trigger signal input from the signal reception component or the control component.

7. The control circuit according to claim 6, wherein, the signal amplification component comprises a first signal amplification subcomponent, a second signal amplification subcomponent, and a third signal amplification subcomponent, an input terminal of the first signal amplification subcomponent is coupled to the input terminal of the signal amplification component, an output terminal of the first signal amplification subcomponent is coupled to an input terminal of the second signal amplification subcomponent, an output terminal of the second signal amplification subcomponent is coupled to an input terminal of the third signal amplification subcomponent, and an output terminal of the third signal amplification subcomponent is coupled to the output terminal of the signal amplification component, and the first signal amplification subcomponent is configured to amplify the trigger signal input from the input terminal of the signal amplification component and transmit the signal amplified by the first signal amplification subcomponent to the second signal amplification subcomponent, the second signal amplification subcomponent is configured to amplify the signal received by the second signal amplification subcomponent and transmit the signal amplified by the second signal amplification subcomponent to the third signal amplification subcomponent, and the third signal amplification subcomponent is configured to amplify the signal received by the third signal amplification subcomponent and transmit the signal amplified by the third signal amplification subcomponent to the output terminal of the signal amplification component.

8. The control circuit according to claim 7, wherein, the first signal amplification subcomponent comprises a first triode, a control terminal of the first triode is coupled to the input terminal of the first signal amplification subcomponent, and a first terminal of the first triode is coupled to the input terminal of the second signal amplification subcomponent and an output terminal of the energy storage part, the second signal amplification subcomponent comprises a second triode, a control terminal of the second triode is coupled to the input terminal of the second signal amplification subcomponent, a first terminal of the second triode is coupled to the output terminal of the energy storage part, and a second terminal of the second triode is coupled to a second terminal of the first triode, the third signal amplification subcomponent comprises a third triode, a third capacitor and a sixth diode, a control terminal of the third triode is coupled to the second terminal of the first triode and the second terminal of the second triode, a first terminal of the third triode is coupled to the output terminal of the signal amplification component, the first terminal of the third triode is further coupled to an anode of the sixth diode, a cathode of the sixth diode is coupled to the output terminal of the energy storage part, a second terminal of the third triode is coupled to the first ground terminal, one terminal of the third capacitor is coupled to the second terminal of the first triode and the second terminal of the second triode, and the other terminal of the third capacitor is coupled to the first ground terminal.

9. The control circuit according to claim 6, wherein, the switch part comprises a relay, and a control terminal of the relay comprises a first control terminal and a second control terminal, the first control terminal of the relay is coupled to an output terminal of the energy storage part, and the second control terminal of the relay is coupled to the output terminal of the signal amplification component.

10. The control circuit according to claim 1, wherein, the control circuit further comprises a rectification part, an input terminal of the rectification part is coupled to the power input terminal, an output terminal of the rectification part is coupled to the input terminal of the energy storage part, and the rectification part converts AC power input from the power input terminal into DC power.

11. The control circuit according to claim 10, wherein, the input terminal of the rectification part comprises a first AC input terminal and a second AC input terminal, and the first AC input terminal is coupled to the input terminal of the switch part, and the rectification part comprises a first capacitor, a second capacitor, a first diode, a second diode, a third diode and a fourth diode, one terminal of the first capacitor is coupled to the first AC input terminal of the rectification part, the other terminal of the first capacitor is coupled to a cathode of the first diode, one terminal of the second capacitor is coupled to the cathode of the first diode, the other terminal of the second capacitor is coupled to the output terminal of the switch part, an anode of the first diode is coupled to the first ground terminal, an anode of the second diode is coupled to the cathode of the first diode, a cathode of the second diode is further coupled to the output terminal of the rectification part, an anode of the third diode is coupled to the first ground terminal, a cathode of the third diode is coupled to the second AC input terminal of the rectification part, an anode of the fourth diode is coupled to the cathode of the third diode, and a cathode of the fourth diode is coupled to the output terminal of the rectification part.

12. The control circuit according to claim 1, wherein, the energy storage part comprises a fourth capacitor and a tenth resistor, one terminal of the tenth resistor is coupled to the input terminal of the energy storage part, the other terminal of the tenth resistor is coupled to a positive pole of the fourth capacitor, a negative pole of the fourth capacitor is coupled to a first ground terminal, and the positive pole of the fourth capacitor is an output terminal of the energy storage part.

13. A display apparatus, comprising a remote control, a processor, a peripheral circuit coupled to the processor and a switch power control device, wherein the switch power control device comprises a power component and a power hard switch, and the switch power control device further comprises the control circuit according to claim 1, the power hard switch is coupled to an AC power supply, the power input terminal of the control circuit is coupled to the power hard switch, the output terminal of the control circuit is coupled to an input terminal of the power component, and the control circuit controls the input terminal of the power component to be coupled to the AC power supply based on whether the input terminal of the switch part is coupled to the output terminal of the switch part or not, an output terminal of the switch power control device is coupled to a power input terminal of the processor and is configured to supply power for operation of the processor, and the remote control is in communication with the switch power control device and is configured to emit a trigger signal to the switch power control device.

14. A control circuit, comprising a power input terminal, an energy storage part, a switch part, a trigger part, and an output terminal, wherein, an input terminal of the energy storage part is coupled to the power input terminal, the energy storage part is configured to supply power to the control circuit after storing electric energy, an input terminal of the switch part is coupled to the power input terminal, an output terminal of the switch part is coupled to the output terminal of the control circuit, a control terminal of the switch part is coupled to an output terminal of the trigger part, the trigger part is configured to receive a trigger signal and send the received trigger signal to the switch part, and the switch part is configured to control the input terminal of the switch part to be coupled to the output terminal of the switch part based on the trigger signal received by the control terminal of the switch part from the trigger part, wherein, the trigger part comprises a signal reception component and a control component, when the control component is powered on and in an operation state, the signal reception component delivers the received trigger signal to the control component through an output terminal of the signal reception component, the control component decodes, after receiving the trigger signal from the signal reception component, the received trigger signal, and when the decoded signal is a turn-off signal, the decoded signal is delivered to the output terminal of the trigger part, such that the control terminal of the switch part controls, after receiving the turn-off signal, the input terminal of the switch part to be disconnected from the output terminal of the switch part, and the energy storage part is charged to store electric energy by coupling the input terminal of the energy storage part to the power input terminal;

when the control component is powered off, the signal reception component delivers the received trigger signal directly to the output terminal of the trigger part through the output terminal of the signal reception component, and the control terminal of the switch part controls, after receiving the trigger signal, the input terminal of the switch part to be coupled to the output terminal of the switch part;

wherein, the control component comprises an amplification subcomponent, a first photocoupler, a second photocoupler, and a control subcomponent, an input terminal of the amplification subcomponent is coupled to an input terminal of the control component, an output terminal of the amplification subcomponent is coupled to an input terminal of the first photocoupler, a first output terminal of the first photocoupler is coupled to an input terminal of the control subcomponent, a second output terminal of the first photocoupler is coupled to a second ground terminal, a power terminal of the first photocoupler is coupled to the output terminal of the energy storage part, a control terminal of the control subcomponent is coupled to an input terminal of the second photocoupler, a first output terminal of the second photocoupler is coupled to the output terminal of the energy storage part, and a second output terminal of the second photocoupler is coupled to an output terminal of the control component, and the amplification subcomponent is configured to amplify the trigger signal received from the signal reception component, the first photocoupler is configured to transmit the amplified trigger signal from the amplification subcomponent to the control subcomponent, the control subcomponent is configured to process the received amplified trigger signal, and the second photocoupler is configured to, when the processed trigger signal is the turn-off signal, transmit the turn-off signal from the control subcomponent to the output terminal of the control component;

wherein, the amplification subcomponent comprises a fourth triode, a control terminal of the fourth triode is coupled to the input terminal of the control component, a first terminal of the fourth triode is coupled to the input terminal of the first photocoupler, and a second terminal of the fourth triode is coupled to the first ground terminal.

15. The control circuit according to claim 14, wherein, the control terminal of the fourth triode is a base of the fourth triode, the first terminal of the fourth triode is a collector of the fourth triode, and the second terminal of the fourth triode is an emitter of the fourth triode.

16. A control circuit, comprising a power input terminal, an energy storage part, a switch part, a trigger part, and an output terminal, wherein, an input terminal of the energy storage part is coupled to the power input terminal, the energy storage part is configured to supply power to the control circuit after storing electric energy, an input terminal of the switch part is coupled to the power input terminal, an output terminal of the switch part is coupled to the output terminal of the control circuit, a control terminal of the switch part is coupled to an output terminal of the trigger part, the trigger part is configured to receive a trigger signal and send the received trigger signal to the switch part, and the switch part is configured to control the input terminal of the switch part to be coupled to the output terminal of the switch part based on the trigger signal received by the control terminal of the switch part from the trigger part, wherein, the trigger part comprises a signal reception component and a control component, when the control component is powered on and in an operation state, the signal reception component delivers the received trigger signal to the control component through an output terminal of the signal reception component, the control component decodes, after receiving the trigger signal from the signal reception component, the received trigger signal, and when the decoded signal is a turn-off signal, the decoded signal is delivered to the output terminal of the trigger part, such that the control terminal of the switch part controls, after receiving the turn-off signal, the input terminal of the switch part to be disconnected from the output terminal of the switch part, and the energy storage part is charged to store electric energy by coupling the input terminal of the energy storage part to the power input terminal;

when the control component is powered off, the signal reception component delivers the received trigger signal directly to the output terminal of the trigger part through the output terminal of the signal reception component, and the control terminal of the switch part controls, after receiving the trigger signal, the input terminal of the switch part to be coupled to the output terminal of the switch part;

wherein, the control component comprises an amplification subcomponent, a first photocoupler, a second photocoupler, and a control subcomponent, an input terminal of the amplification subcomponent is coupled to an input terminal of the control component, an output terminal of the amplification subcomponent is coupled to an input terminal of the first photocoupler, a first output terminal of the first photocoupler is coupled to an input terminal of the control subcomponent, a second output terminal of the first photocoupler is coupled to a second ground terminal, a power terminal of the first photocoupler is coupled to the output terminal of the energy storage part, a control terminal of the control subcomponent is coupled to an input terminal of the second photocoupler, a first output terminal of the second photocoupler is coupled to the output terminal of the energy storage part, and a second output terminal of the second photocoupler is coupled to an output terminal of the control component, and the amplification subcomponent is configured to amplify the trigger signal received from the signal reception component, the first photocoupler is configured to transmit the amplified trigger signal from the amplification subcomponent to the control subcomponent, the control subcomponent is configured to process the received amplified trigger signal, and the second photocoupler is configured to, when the processed trigger signal is the turn-off signal, transmit the turn-off signal from the control subcomponent to the output terminal of the control component;

wherein, the control subcomponent comprises a control chip and a fifth triode, an input terminal of the control chip is coupled to the input terminal of the control subcomponent, a control terminal of the control chip is coupled to the control terminal of the fifth triode, a first terminal of the fifth triode is coupled to the control terminal of the control subcomponent and to the input terminal of the second photocoupler, and a second terminal of the fifth triode is coupled to the second ground terminal.

17. The control circuit according to claim 16, wherein, the control terminal of the fifth triode is a base of the fifth triode, the first terminal of the fifth triode is a collector of the fifth triode, and the second terminal of the fifth triode is an emitter of the fifth triode.

* * * * *